Sept. 25, 1956 — E. T. ARMSTRONG — 2,764,371
APPARATUS FOR LANDING AIRCRAFT
Filed April 13, 1954 — 2 Sheets-Sheet 1
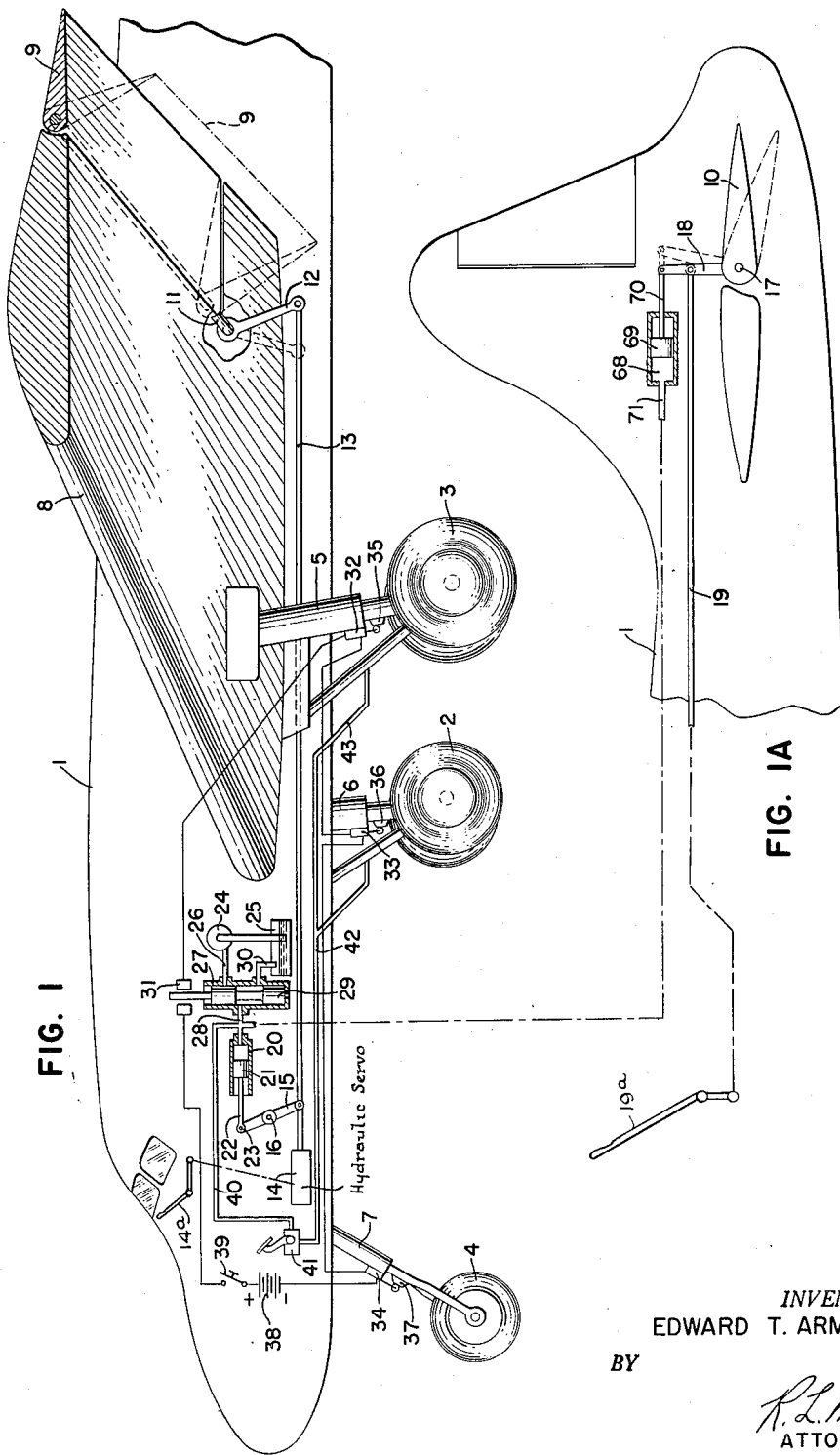
*INVENTOR.*
EDWARD T. ARMSTRONG
BY
*R. L. Miller*
ATTORNEY Sept. 25, 1956  E. T. ARMSTRONG  2,764,371
APPARATUS FOR LANDING AIRCRAFT
Filed April 13, 1954  2 Sheets-Sheet 2
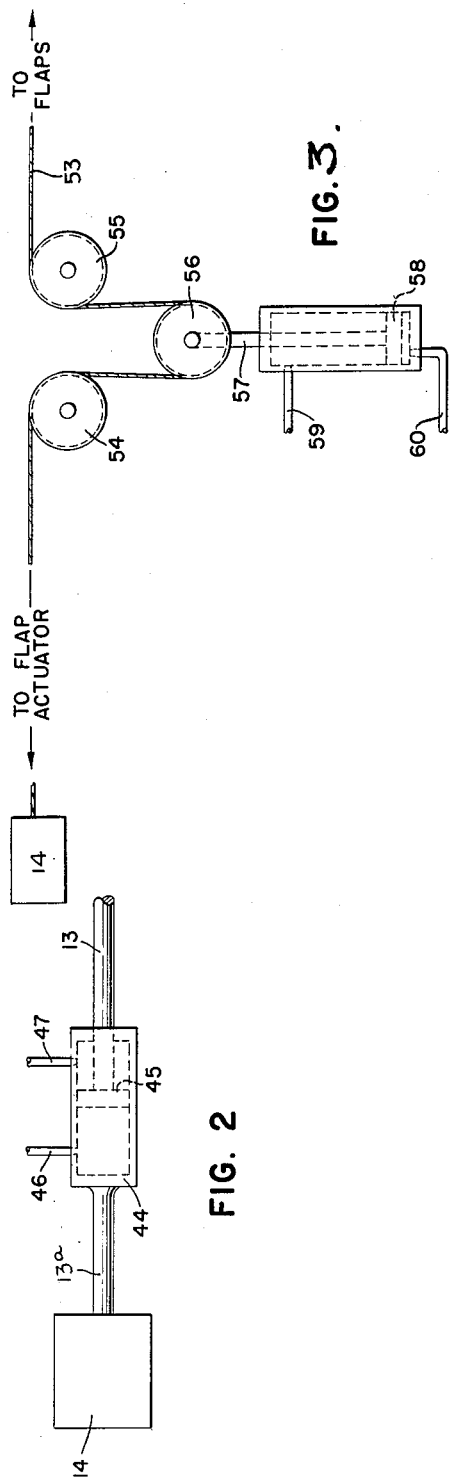
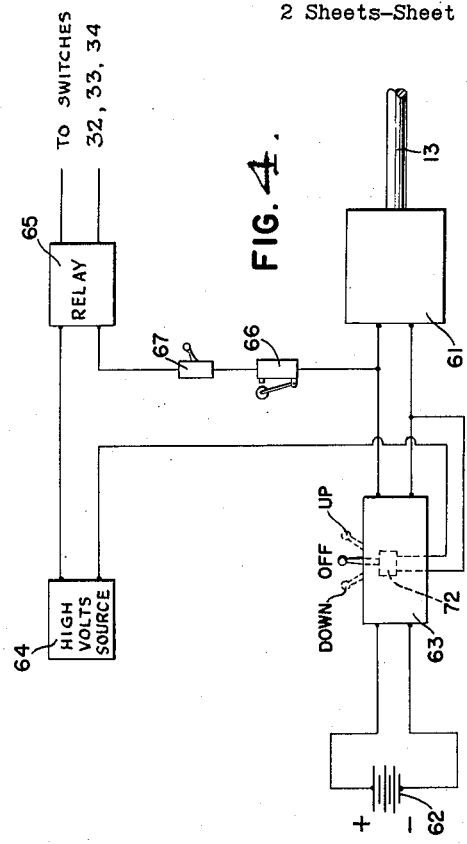
INVENTOR.
EDWARD T. ARMSTRONG
BY
R. L. Miller
ATTORNEY

United States Patent Office 2,764,371
Patented Sept. 25, 1956

2,764,371

APPARATUS FOR LANDING AIRCRAFT

Edward T. Armstrong, Wanaque, N. J., assignor to The Goodyear Tire & Rubber Company, Akron, Ohio, a corporation of Ohio Application April 13, 1954, Serial No. 422,733

15 Claims. (Cl. 244—31)

This invention relates to the landing of aircraft and is especially useful in providing the most efficient braking of the wheels to reduce landing runs to a minimum.

It is conventional practice to construct fixed wing airplanes with flap mechanism for increasing the lift of the wings upon take-off and landing, the flaps usually being retracted when the airplane is cruising so as to decrease the wing lift normally with a reduction of drag and an attendant speedup of the airplane. Such flap mechanism normally is fairly complex, and particularly on larger airplanes, must be moved by power means which operate the flaps relatively slowly.

In landing an airplane, at the instant of touch-down the lift of the wings is slightly less than or about equal to the weight of the airplane dependant upon the type of ship, its landing gear or the pilot technic. In any event, once the airplane is on the ground the weight of the airplane is progressively transferred from the wings to the wheels. During the landing run the wing lift falls off in approximate proportion to the square of the velocity of the aircraft. Thus, at the start of the landing run only a small fraction of the airplane weight is on the wheels, but with the weight on the wheels building up as the speed of the aircraft diminishes.

It is equally well known that the force required to overcome frictional contact between members is equal to the coefficient of friction multiplied by weight, i. e.

(1) $F = fm$ wherein:

$F$ = force
$f$ = coefficient of friction between surfaces
$m$ = mass or weight holding surfaces together Now, just after an airplane has touched down and with a high percentage of the weight of the airplane carried by the wings, and with the flaps in extended highlift position, the $m$ or mass of Equation (1) is relatively small and the airplane brakes can be applied only relatively lightly in order not to generate a force F so great that it will exceed the coefficient of friction between the airplane tires and the landing strip multiplied by the mass or weight of the airplane holding the tires against the strip. As the weight of the plane gradually transfers to the wheels the airplane brakes can be applied more strongly.

It is the general object of the invention to automatically effect a relatively rapid transfer of the weight of the airplane from the wings to the wheels once the airplane is on the ground and very early in the landing run of the airplane, and with simultaneous or sequential braking of the airplane wheels.

It is an object of the invention to achieve a "dumping" of substantially all or a relatively large portion of the airplane weight from the wings to the wheels by rapidly reducing the effective wing lift by quick retraction of the flaps, and/or by changing the angle of attack of the airplane wings.

Another object of the invention is the provision of mechanism and apparatus as described which function without pilot attention during the busy and concentration-demanding touch-down and landing run of an airplane.

Another object is to provide the combination in an airplane of means for sensing touch-down, means controlled by the operation of the sensing means for rapidly destroying wing lift, and means releasing the wheel brakes for operation upon operation of the means for destroying wing lift.

A specific object of the present invention is the provision of automatic mechanism to effect a much more rapid than normal transfer of wing lift to wheel loads by retracting the flaps as rapidly as possible and/or by programming elevator positioning to decrease even to a negative amount the wing angle of attack.

Another specific object of the invention is the provision of mechanism supplemental to the conventional flap retracting means and operable independently of and without interference with such means for effecting extra fast flap retraction.

Other objects of the invention are to provide for shorter landing runs, and to provide for more efficient application of airplane brakes.

These and other objects will appear from the following description and the accompanying drawings.

Of the drawings,

Fig. 1 is a perspective view of an aircraft looking from the side of the craft below the wing, portions of the craft being broken away and portions shown in section.

Fig. 1a is a continuation of Fig. 1 showing the tail portion thereof.

Figs. 2 to 4 are fragmentary and diagrammatic views of modifications of the invention and particularly showing mechanisms for effecting rapid flap retraction.

Referring to the drawings, these show an airplane 1 having landing wheels 2, 3 and 4 arranged in tricycle formation, the wheel 4 being the nose wheel and each of the wheels being mounted upon telescoping oleo struts 5, 6 and 7 respectively, the nose wheel being mounted for castering and all of the wheels being retractable. A portion of one wing 8 of the plane is shown and this is provided with a one element flap 9, it being understood that the opposite wing has a similar flap. The flap 9 has been shown for purposes of simplicity as a one element flap and with simplified controls. However, it will be understood that any of the more complicated flap control linkages or plural-element flaps more conventionally employed on airplanes can be utilized. The elevator 10 is also shown in Fig. 1a.

The flap 9 is shown as arranged for hydraulic operation and for this purpose is mounted to rotate with a shaft 11 which has a horn 12 secured thereto pivotally connected by a rod 13 to a hydraulic operating or servo cylinder 14. The hydraulic cylinder 14 may be operated by an operating lever 14a and rod 13 also connects to a lever 15 mounted on a pivot 16. The flap is shown in retracted position in full lines and in down flap position in dot and dash lines. The arrangement is such that the flap is moved by cylinder 14 which is under the control of the pilot by conventional means (not shown). The elevator 10 is mounted for pivotal control on a shaft 17 to which is secured an operating horn 18 pivotally attached to a control rod 19 which connects it to an operating lever 19a which is also within control of the pilot at all times.

In accord with the principles of the invention, provision is made for rapid transfer of wing lift to wheel loads by automatic retraction of the flaps as rapidly as possible upon touch-down. For this purpose a single acting hydraulic cylinder 20, capable of overriding the operation of cylinder 14, is mounted near lever 15 and its piston 21 is connected to a rod 22 pivotally connected to lever 15, as at 23. Fluid under pressure is supplied to cylinder 20 by a pump 24 which draws fluid from a sump 25 and delivers it through a pipe 26 to a solenoid operated valve 27 connected to cylinder 20 by a pipe 28. A valve spool 29 has a groove thereabout and normally shuts off the supply pipe 26 from pipe 28 and connects pipe 28 by way of the groove to an exhaust line 30 which returns fluid from cylinder 20 to the sump 25. A solenoid 31 is mounted about the stem of the valve spool 29 and energizing of the solenoid raises the spool to a position where the groove about the spool connects the pipe 28 to the supply pipe 26 and closes the exhaust pipe 30, whereupon piston 21 is moved rapidly to the left moving lever 15 about its pivot and retracting the flap 9.

The solenoid 31 is adapted to be energized immediately upon definite touch-down and after all wheels are in contact with the runway. Full touch-down can be sensed by centrifugal switches in the wheels, or can be made responsive to closing the throttles of the airplane engines. In the embodiment of the invention shown each oleo strut 5, 6 and 7 has a micro switch 32, 33 and 34 respectively mounted upon the cylinder section thereof and engageable by a cam, 35, 36 and 37 respectively, mounted upon the piston section thereof, the arrangement being such that each switch is closed upon light initial loading of its wheel and consequent partial telescoping of the strut, and remains open when the wheel is out of ground contact. The solenoid 31 is mounted in series with micro switches 32, 33 and 34 and a power source 38, such as an electric battery or generator, and a pilot controlled manually operated arming switch 39, the arrangement being such that the solenoid 31 cannot be energized unless all of the switches are closed. In flight, the micro switches 32, 33 and 34 are all open, but, with the arming switch 39 closed, so that immediately upon contact of all wheels with the ground solenoid 31 is energized to automatically and quickly retract the flaps and thereby notably reduce the wing lift to dump the weight of the airplane on the wheels very early in the landing run.

An important feature of the invention is that the brakes of the airplane are tied in with the retraction of the flaps, and so that the brakes cannot be actuated before touch-down, but are automatically set into operation, or are put into condition for operation simultaneously with the dumping of lift from the wings. For this purpose, a branch pipe 40 extends from pipe 28 to a brake pressure valve 41 from which conduits 42 and 43 extend to the hydraulic brakes associated with the airplane wheels.

Thus, in the operation of the invention it is impossible to come in for a landing with the wheels locked at touch-down. In addition, and all without pilot attention, as soon as definite touch-down is established, the flaps are automatically and quickly retracted early in the landing run, and the brakes are connected for operation. Because of the additional weight on the landing wheels the wheel brakes can be applied much more strongly than in present day practice, and the overall distance of the landing run is reduced by distances up to 25 to 30%. These figures are easily demonstrated and obviously represent notably and worthwhile advantages, and may well comprise the difference between running out of runway or not in a landing.

The flap retracting mechanism heretofore described is preferably supplemented by one or another of the arrangements shown in Figs. 2 to 4 so as to effect extra rapid flap retraction without interfering with the normal operation of the flap positioning means. In Fig. 2 is shown a hydraulic system in which the flap actuating rod 13 is normally operated by hydraulic cylinder 14 (as described above). However, instead of placing the special retracting cylinder 20 as shown in Fig. 1, the rod 13 is cut to provide sections 13, 13a thereof and a cylinder 44, which replaces the cylinder 20 of Fig. 1, is connected to one end 13a of the rod and the other end of the rod is connected to the piston 45 of the cylinder. Conduits 46 and 47 adapted to be connected alternately to pump 24 or sump 25 supply fluid under pressure to rapidly drive piston 45 to either end of the cylinder 44 to apply or retract the flaps, all without interfering with the operation of the usual flap moving cylinder 14. Of course, fluid under pressure is applied to either conduit 46 or conduit 47 by means of valve 27 which can be made to provide fluid pressures to perform the stated function, all under control of touch-down switches 32, 33 and 34 which operate solenoid 31 in turn operating valve 27.

It will be noted that the cylinder 44 is of smaller diameter than cylinder 14 whereby the movement of the flaps to retracted position after touch-down is very rapid, for example, consuming only several seconds time. In this retracting movement the aerodynamic flow over the flap assists in the retracting movement thereof.

Fig. 3 shows mechanism adapted to be employed with cable type flap actuating means. The numeral 53 indicates the cable extending between the flaps and the flap actuator such as servo cylinder 14 and mechanism is provided for rapidly shortening this cable, all without interfering with the usual flap actuator (not shown). This mechanism takes the form of a pair of cable support pulleys 54 and 55 spaced apart a distance to allow a third pulley 56 to pass therebetween. The pulley 56 is rotatably mounted on the bifurcated end of a piston rod 57 secured to a piston 58 of a hydraulic cylinder having fluid under pressure supplied to a selected end such as the rod end of the cylinder by conduit 59 connected to conduit 28 by valve 27 the opposite end of cylinder 58 being connected to exhaust through conduit 60 under the control of valve 27. In this form of the invention the flap is retracted by aerodynamic forces and/or flap retraction springs when piston 58 is moved upwardly in cylinder.

In Fig. 4 is illustrated a modified rapid flap retractor mechanism utilizing electrical means. As before, the flap actuating rod is shown by numeral 13, but the rod is adapted to be positioned by an electric motor 61, this motor being the power means replacing servo means 14 for normally positioning the flaps. The motor 61 is driven from the airplane battery 62 through an on-off-reversing switch 63 corresponding to control 14a. Associated in the combination is a high voltage source 64 and adapted to be connected to the flap actuating motor 61 by means of the sensing and control unit 65.

The unit 65 is a relay adapted to take the place of solenoid 31 and the relay connects the high voltage source 64 with the motor 61 when all the micro switches 32, 33 and 34 are closed with the airplane in touch-down and beginning its landing run. The high voltage application to the motor 61, for example at a voltage twice or three times that normally used to drive the motor 61 causes it to be driven at speeds two or three times normal to give a much faster retraction than normal to the flaps, and to very quickly transfer the weight of the airplane to the wheels quite early in the landing run of the airplane. A limit switch 66 opens the high voltage circuit when the flaps are fully retracted. The overleading of the motor 61 for the short periods entailed is not harmful.

To return the flaps to extended position the high voltage circuit is broken by a switch 67 and the flaps are driven by motor 61 with normal voltage through reversing switch 63.

It is part of the inventive concept to concurrently or alternately reduce the lift of the airplane wings by diminishing the angle of attack thereof and even going to a negative angle, immediately upon complete touch-down of the airplane. This is particularly practical upon airplanes having tricycle type landing gear. In such airplanes the elevators 10 can be lowered simultaneously with or alternatively to retraction of the flaps when the wheels contact the runway. For this purpose a hydraulic cylinder 68 is mounted at the elevator and has a piston 69 connected by a rod 70 to the elevator operating horn 18. Cylinder 68 is connected to pipe 28 by a pipe 71 so that cylinders 20 and 68 are operated simultaneously, in the embodiment of the invention shown, by the valve 27. The arrangement is such that immediately upon complete touch-down, the elevators 10 are lowered to produce maximum possible loading of the nose wheel 4, thereby to decrease the angle of attack of the wings to reduce their lift. The oleo strut 7 of the nose wheel can be made somewhat softer than usual to improve this action.

From the foregoing, it will be seen that by use of the invention a material decrease in aircraft lift is accomplished earlier in the landing run than would be accomplished by manual or other normal control of flaps or wing angle of attack, and this is accomplished automatically while at the same time the flaps and elevators are positively connected to their manual or normal operating means and are fully controllable by the pilot. The rapid transfer of wing lift to wheel loading provides for far more effective use of the brakes and makes possible materially shorter landing runs. The invention is especially effective when used with automatically controlled antiskid braking systems, for example, such as disclosed in the Bricker and Curl application, Serial No. 339,367, filed February 27, 1953, now Patent No. 2,698,021, entitled "Inertia Valve Anti-Skid Control."

The invention may and preferably does include mechanism whereby the conventional flap control means can at any time supersede the rapid flap retraction means. For example, in Fig. 4 the existing flap switch 63, having "down," "off," and "up" positions, is provided with an extra single pole, single throw switch 72 which is closed only when the handle of flap switch 63 is in "off" position. Switch 72 is in the lead from the high voltage source 64 to the flap actuator 61. Hence, the flaps can be given the rapid retraction heretofore described only when the flap switch 63 is in "off" position, it being understood that in the system shown the flaps are moved to the desired down position by moving the switch handle to "down" and holding it there until the flaps are in the desired position whereupon the handle is returned to "off." Also, the presence of the switch 72 in the flap switch 63 means that at any time the pilot may take over the airplane, as in case of an aborted landing, and throw flap switch 63 to "down." This opens switch 72 and cuts the flow of high voltage to flap actuator 61 and causes the flaps to move down to takeoff position under the action of flap actuator 61 driven by the normal voltage of source 62.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in apparatus for shortening the landing run of an airplane having landing wheels connected thereto and flaps for increasing lift of the airplane of sensing means associated with each landing wheel for determining complete touch-down of the airplane, said sensing means comprising a limit switch at each wheel connected in series in a circuit with a power source, and means including a solenoid valve having its solenoid in said circuit and pressure fluid controlled cylinder means operated thereby and responsive to the operation of all of the sensing means for rapidly retracting the flaps of the airplane, said flap-retracting means being additional to and selectively operable in conjunction with the mechanism provided on the airplane for positioning the flaps.

2. The combination in apparatus for shortening the landing run of an airplane having conventional hydraulic flap operating mechanism of electrical sensing means for determining complete touch-down of the airplane, and solenoid valve controlled hydraulic means responsive to the sensing means for rapidly retracting the flaps of the airplane, said flap-retracting means being capable of overpowering the conventional flap operating mechanism provided on the airplane, but operating through the same linkage as such mechanism.

3. The combination in apparatus for shortening the landing run of a tricycle landing gear airplane having landing wheels on such landing gear and flaps for increasing lift, of sensing means associated with each landing wheel for determining complete touch-down of the airplane, means responsive to the operation of all of the sensing means for rapidly and in a few seconds' time retracting the flaps of the airplane, means responsive to the sensing means for simultaneously depressing the elevators to decrease the angle of attack of the wings, and means operable simultaneously with and associated with the flap-retracting means for operation thereby to connect the airplane brakes for operation.

4. The combination in apparatus for shortening the landing run of a tricycle landing gear airplane having landing wheels on such landing gear and flaps for increasing lift, of sensing means associated with each landing wheel for determining complete touch-down of the airplane, means responsive to the operation of all of the sensing means for rapidly retracting the flaps of the airplane, said flap-retracting means being additional to and selectively operable in conjunction with the mechanism provided on the airplane for positioning the flaps, means responsive to and operable simultaneously with the sensing means for depressing the elevators to decrease the angle of attack of the wings, and means operable simultaneously with the flap-retracting means to connect the airplane brakes for operation.

5. The combination in apparatus for shortening the landing run of a tricycle landing gear airplane having landing wheels on such landing gear and flaps for increasing lift, of sensing means associated with each landing wheel for determining complete touch-down of the airplane, means responsive to the operation of all of the sensing means for rapidly retracting the flaps of the airplane, said flap-retracting means being capable of overriding the conventional flap operating mechanism provided on the airplane, but operating through the same linkage as such mechanism, means responsive to and associated with the sensing means for depressing the elevators to decrease the angle of attack of the wings, and means operable simultaneously with and controlled by: the flap-retracting means to connect the airplane brakes for operation.

6. The combination in apparatus for shortening the landing run of a tricycle landing gear airplane having landing wheels on such landing gear and flaps for increasing lift, of sensing means associated with each of the landing wheels for determining complete touch-down of the airplane, means responsive to the operation of all of the sensing means for rapidly retracting the flaps of the airplane, said flap-retracting means being additional to and selectively operable in conjunction with the mechanism provided on the airplane for positioning the flaps, and means responsive to and associated with the sensing means for depressing the elevators to decrease the angle of attack of the wings.

7. The combination in apparatus for shortening the landing run of a tricycle landing gear airplane having landing wheels on such landing gear and flaps for increasing lift, having conventional hydraulic flap operating mechanism of sensing means for determining complete touch-down of the airplane, hydraulic means responsive to the sensing means for rapidly retracting the flaps of the airplane, said flap-retracting means being capable of overriding the conventional flap operating mechanism provided on the airplane, but operating through the same linkage as such mechanism, and means responsive to and associate with the sensing means and the flap retracting means for depressing the elevators to decrease the angle of attack of the wings.

8. The combination in apparatus for shortening the landing run of a tricycle landing gear airplane having landing wheels mounted on said landing gear of sensing means associated with each of the landing wheels; for determining complete touch-down of the airplane, means responsive to the operating of all of the sensing means adapted for rapidly and in a few seconds time retracting the flaps of the airplane, and means responsive to the sensing means and associated with the flap retracting means and simultaneously operable therewith and adapted to depress the elevators to decrease the angle of attack of the wings.

9. The combination in apparatus for shortening the landing run of a tricycle landing gear airplane having landing wheels on said landing gear and elevators on said airplane of sensing means associated with each of the landing wheels for determining complete touch-down of the airplane, means responsive to the operation of all of the sensing means adapted to depress the elevators to decrease the angle of attack of the wings, and means associated with the elevator depressing operable simultaneously with the elevator depressing means to connect the airplane brakes for operation.

10. The combination in apparatus for shortening the landing run of a tricycle landing gear airplane having landing wheels and brakes associated therewith of sensing means associated with each of the landing wheels for determining complete touch-down of the airplane, means responsive to the operation of all of the sensing means to decrease the angle of attack of the wings, and means operable simultaneously with and associated with the angle of attack decreasing means to connect the airplane brakes for operation.

11. Apparatus for landing aircraft having a multiple-wheeled landing gear with landing wheels rotatably mounted thereon, airfoils having auxiliary movable flaps for increasing their lift and manually controlled means for moving said flaps, said apparatus comprising a limit switch touch-down sensing means at each wheel of the landing gear and connected in series for collectively indicating touchdown, power-operated means for retracting said flaps, and means electrically controlled operable upon collective sensing of touch-down at all wheels and including a solenoid operated valve in series with said switches for initiating operation of such power operated retracting means.

12. Apparatus for safely landing aircraft having a multiple-wheeled landing gear, movable flaps for changing the camber and drag of wing surfaces, movable elevators, and manually controlled means for moving said flaps and said elevators, said apparatus comprising touch-down sensing means at each wheel of the landing gear, power operated means for simultaneously retracting the flaps and lowering said elevators, and means associated with said sensing means and operable instantaneously upon collective sensing of touch-down at all wheels for initiating operation of such power operated means.

13. Apparatus for safely landing aircraft having a multiple-wheeled landing gear, movable flaps for changing the camber and drag of wing surfaces, movable elevators, and manually controlled means for moving said flaps and said elevators, said apparatus comprising touch-down sensing means at each wheel of the landing gear, power operated means for simultaneously retracting the flaps and lowering said elevators, means maintaining said power operated means in non-effective position during flight to permit manual control of said flaps and elevators, and means associated with said sensing means and operable upon collective sensing of touch-down at all wheels for initiating operation of such power operated means.

14. The combination in apparatus for shortening the landing run of an airplane having landing wheels connected thereto, brakes for engaging said landing wheels, and flaps on said airplane to provide increased lift of sensing means disposed at each of said landing wheels and controlled by touchdown thereof for determining complete touchdown of the airplane, means responsive to the sensing means for rapidly and in a few seconds time retracting the flaps of the airplane, and means operable simultaneously with and connected to the flap-retracting means for control thereby to connect the airplane brakes for operation upon touchdown of the airplane.

15. The combination in apparatus for shortening the landing run of an airplane having landing wheels connected thereto, brakes for engaging said landing wheels, flaps on the airplane to provide increased lift and pilot-operated control means for positioning said flaps, of sensing means at said landing wheels and controlled by touchdown thereof for determining complete touchdown of the airplane, means responsive to the sensing means for rapidly retracting the flaps of the airplane, said flap-retracting means being additional to and selectively operable in conjunction with the mechanism provided on the airplane for positioning the flaps, means operable simultaneously with the flap-retracting means to connect the airplane brakes for operation, and means rendering said sensing means ineffective for retracting the flaps when the pilot-operated control of said flap-positioning means is functioning.

References Cited in the file of this patent

UNITED STATES PATENTS

| | | |
|---|---|---|
| 1,779,168 | Isom | Oct. 21, 1930 |
| 1,908,408 | Cox | May 9, 1933 |
| 2,173,273 | De Seversky | Sept. 19, 1939 |
| 2,473,792 | Fontaine | June 21, 1949 |
| 2,574,426 | Trevaskis | Nov. 6, 1951 |
| 2,612,331 | Frazier et al. | Sept. 30, 1952 |

FOREIGN PATENTS

| | | |
|---|---|---|
| 852,753 | France | Nov. 9, 1939 |